Patented Aug. 26, 1947

2,426,476

UNITED STATES PATENT OFFICE 2,426,476

DI(TERTIARY ALKYL) PEROXIDE POLYMERIZATION CATALYSTS

William E. Vaughan and Frederick F. Rust, Berkeley, Calif., assignors to Shell Development Company, San Francisco, Calif., a corporation of Delaware No Drawing. Application March 29, 1943, Serial No. 481,052

12 Claims. (Cl. 260—78.4)

This invention relates to synthetic resins and more particularly to the production of synthetic resins by the use of di(tertiary alkyl) peroxides as catalysts for the polymerization of unsaturated organic compounds. This application is a continuation-in-part to our co-pending application, Serial Number 474,224, filed January 30, 1943.

Of the numerous organic and inorganic peroxides which have been suggested as polymerization catalysts, benzoyl peroxide is the most extensively used, because of its availability and its rapid action. Benzoyl peroxide is, however, relatively unstable, and requires great care in preparation, handling and storage. It has the further disadvantage of discoloring the products of the reactions which it catalyzes.

It is an object of the present invention to provide effective polymerization catalysts which can be prepared easily and cheaply, which are relatively stable, and which remain substantially colorless under polymerization reaction conditions and, as well, during prolonged storage. Another object is to provide an improved process for forming synthetic resins from polymerizable organic compounds. Other objects will be apparent from the description given hereinafter.

These objects are accomplished in accordance with this invention by the use of di(tertiary alkyl) peroxides as polymerization catalysts and by the polymerization of polymerizable organic compounds in the presence of these peroxides. It has been found that the di(tertiary alkyl) peroxides, which are surprisingly stable as compared to other peroxides, are nevertheless excellent catalysts for the preparation of high molecular weight resinous polymers from polymerizable unsaturated organic compounds. Further, there is substantially no development of color during the polymerization reaction even under rigorous conditions and when comparatively large amounts of peroxide are used.

The following examples, in which parts are given on the basis of weight, will serve to illustrate the invention.

Example I

A mixture of 100 parts of diallyl phthalate and 2 parts of di(tertiary butyl) peroxide was placed in a vessel equipped with an efficient stirring mechanism and surrounded by an oil bath thermostatically controlled at 65° C. When the mixture attained a refractive index of 1.5313, it was run slowly with stirring into 6 volumes of methanol. Unreacted monomer dissolved in the methanol, while the partial polymer formed a semi-solid precipitate. The precipitate was separated from the methanol, dried under vacuum and dissolved in an equal amount of a mixture of 3 parts of toluene and 1 part of xylene. The solution was applied as a coating to a clean strip of steel, dried and baked 1 hour at 150° C. A hard, flexible, transparent, water-white film resulted.

Example II 100 parts of methyl methacrylate were mixed with 0.5 part of di(tertiary butyl) peroxide and dispersed in a mixture of 350 parts distilled water and 1 part of poly-methacrylic acid. The poly-methacrylic acid, or the salt thereof formed in the reaction mixture, acts as a dispersing or granulating agent. A sufficient amount of di-sodium acid phosphate containing a small amount of mono-sodium phosphate was added to adjust the pH to approximately 7.5. The dispersion was quickly heated to 110° C. in a closed vessel designed to withstand the pressures developed. In a few minutes the reaction was complete and the polymer, which was largely in the form of small granules, was cooled, separated from the aqueous medium, washed and dried. A solid chip formed from the polymer by compression molding was clear and water-white.

Example III 100 parts of diallyl phthalate, 2 parts of benzoyl peroxide and 2 parts of di(tertiary butyl) peroxide were heated together at 90° C. The resulting resin was hard and clear, but slightly yellow.

Di(tertiary alkyl) peroxides are new compounds which may be generally represented by the formula:

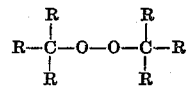

wherein each R represents a like or different alkyl radical which may or may not be further substituted. The di(tertiary alkyl) peroxides have twice the number of carbon atoms per molecule as the compounds from which they were formed and, in this and other ways, are to be distinguished from the previously known tertiary alkyl hydroperoxides.

Particularly useful are the peroxides of the above general formula wherein each R represents a like or different saturated alkyl radical. A subgroup comprises the symmetrical saturated di(tertiary alkyl) peroxides. A specific example of this subgroup is di(tertiary butyl) peroxide, which is formed by a controlled non-explosive oxidation of isobutane with oxygen in the presence of hydrogen bromide at an elevated temperature, which is, however, below the temperature at which spontaneous combustion of the mixture occurs. This new compound is a water-white, water-immiscible liquid, having a pleasant odor, and boiling at about 108° C. to 110° C. It has a specific gravity of about 0.796 at 20° C., and a refractive index $n_D^{20}$ of about 1.3893. This peroxide is unaffected when washed with 65% sulfuric acid, and reacts quantitatively with concentrated hydrogen iodide solution, when heated to about 60° C. for one hour in acetic acid solution, to yield one mol of iodine per mol of the peroxide. When ignited, it does not explode, but burns with a sooty flame. As compared to the known peroxides, this novel di(tertiary butyl) peroxide is surprisingly stable: it does not explode even when dropped onto a hot plate maintained at about 250° C.

The di(tertiary alkyl) peroxides are prepared by the controlled non-explosive oxidation of hydrocarbons containing at least one tertiary carbon atom of aliphatic character in the presence of hydrogen halide, particularly hydrogen bromide or of a compound capable of yielding such hydrogen halide under the operating conditions. The presence of the hydrogen halide directs the oxidation to the tertiary carbon atom, retards the explosion or complete combustion of the starting material, and inhibits the decomposition of the carbon structure.

Among the di(tertiary alkyl) peroxides which may be used as polymerization catalysts in accordance with this invention are those formed from the following saturated aliphatic hydrocarbons: isobutane, 2-methyl butane, 2-ethyl butane, 2-methyl pentane, 3-methyl pentane, 2,3-dimethyl butane, 2,4-dimethyl butane, and their homologues, as well as their halogenated derivatives in which the halogen atom or atoms are attached to the primary or secondary carbon atoms so that the tertiary carbon atom or atoms contain a replaceable hydrogen atom. The following are examples of such halogenated derivatives: 1-halo-2-methyl propane, 1-halo-2-ethyl propane, 1-halo-2-methyl butane, 1-halo-3-methyl butane, 2-halo-3-methyl butane, and the like, and their homologues. Also, one or more of the aliphatic radicals attached to the tertiary carbon atom may be substituted by an aryl or aralkyl radical. As examples of such compounds reference may be made to isopropyl benzene, 1-phenyl-1-methyl propane, 1-phenyl-2-methyl propane, and the like. There may also be used the peroxides formed by the oxidation of mixtures of compounds of this class, as well as mixtures containing one or more of the organic compounds of the above-defined class together with one or more other organic compounds. Asymmetrical organic peroxides may be used, as for example, where one of the radicals attached to the peroxy (—O—O—) radical is a tertiary alkyl radical, while the other is a secondary alkyl radical. The di(tertiary alkyl) peroxides are more fully described and claimed in the aforementioned application, Serial Number 474,224.

The catalyst will ordinarily be dissolved in the polymerizable compound. Amounts of di(tertiary alkyl) peroxides as small as a fraction of a percent, based on the weight of the monomer, are catalytically effective. Larger percentages have correspondingly greater effect. Too much catalyst is generally to be avoided as likely to render the reaction violent or as adversely affecting the properties of the polymer, particularly as to molecular weight and the ramifications thereof. The amount of catalyst may vary from about 0.01% to about 5% by weight of the monomer.

The di(tertiary alkyl) peroxides may be used alone or in conjunction with other catalysts such as benzoyl peroxide, lauroyl peroxide, acetyl peroxide, benzoyl acetyl peroxide and hydrogen peroxide.

The invention may be applied to substantially any polymerizable unsaturated organic compound and is directed particularly to resin-forming unsaturated organic compounds. Notable among these are mono-ethylenic compounds, which contain a single polymerizable carbon-to-carbon double bond as represented by the structure

Included in the mono-ethylenic class is that subclass of compounds containing in the molecule a terminal methylene group attached to carbon by an ethylenic double bond, as represented by the structure

Examples of this subclass of compounds are styrene, alpha-methyl styrene, vinyl and allyl derivatives, and the nitriles and esters of acrylic and alpha-substituted acrylic acids.

Of growing importance for resins are compounds having two or more polymerizable non-conjugated double bonds. Examples of these are the unsaturated alkyl esters of polybasic acids, the unsaturated alkyl ethers of polyhydric alcohols, and the unsaturated acyl esters of polyhydric alcohols, including the hypothetical ethylidene glycol. Here again, a significant subclass is those poly-unsaturated compounds in which there are at least two terminal methylene groups each separately attached to carbon by an ethylenic double bond, the double bonds being in non-conjugated relationship to one another. As illustrations are mentioned di-vinyl phthalate, di-vinyl oxalate, di-allyl phthalate, glycol di-methacrylate, glycerol tri-methacrylate and ethylidene glycol di-acrylate.

Likewise included are compounds having two or more conjugated carbon-to-carbon double bonds, such as butadiene and substituted butadiene, as well as polymers of acetylene, such as vinyl and di-vinyl acetylene. The invention is also operable with cyclic compounds such as coumarone, indene, furfural and cyclohexene.

The invention is applicable to the polymerization of single compounds and to the co-polymerization of two or more compounds. Synthetic resins usually require the addition of one or more plasticizers, stabilizers, lubricants, dyes, pigments, fillers, or other modifiers. Where the modifiers do not chemically react with, or otherwise adversely affect, the ingredients of the reaction mixture, they may be added to the monomer, or to the partially polymerized material during polymerization.

Polymerization will usually be energized by the application of heat, although both heat and light may be used, and in some cases, light is sufficient. The invention may be applied to monomeric compounds in the massive state or to dispersions or solutions of the monomer. Where the dispersion method is employed, it is desirable to select a dispersing medium insoluble in the catalyst involved. With certain compounds polymerization may be effected in vapor state. Continuous or discontinuous processes may be used. Atmospheric, reduced, or superatmospheric pressures may be used.

In general, the temperatures customary for similar polymerization reactions under the influence of benzoyl peroxide may be used. However, the temperatures at which the di(tertiary alkyl) peroxides are most effective are somewhat higher than with benzoyl peroxide. Temperatures above 100° C. are preferred. This usually involves the use of super-atmospheric pressure.

The polymerization reaction may be carried to substantial completion, usually ending in the formation of a solid resin of high molecular weight, or it may be stopped at any point short of completion by the suspension of the conditions necessary for polymerization. Incomplete reaction is usually designed for the production of a viscous syrup, which may be further worked and eventually substantially completely polymerized. A polymerization reaction which is stopped short of completion for an appreciable period of time and subsequently brought to completion is herein called an "interrupted polymerization reaction," and the intermediate product is termed a "partial polymer." Where the partial polymer is a syrup, it may, for instance, be transferred to a mold of any desired configuration and again subjected to polymerization conditions. Completion of the polymerization may be accomplished upon syrup dispersed and held within the interstices of a porous material, i. e. after the impregnation of the material with the syrup. Of special importance is the incomplete polymerization of compounds containing two or more, preferably two, non-conjugated polymerizable unsaturated linkages to a fusible state, followed by the shaping of the incomplete polymer and its subsequent infusibilization by completion of the polymerization. It is believed that the first polymerization period leads to the formation of a linear-type polymer which is changed to a cross-linked structure by the second polymerization. It is advantageous to separate unreacted monomer from polymer at the end of the first period, before completing polymerization, particularly in the case of the mentioned bifunctional compounds.

Generally speaking, polymerization reactions using the catalysts of the present invention are easily controlled. Because of their uniform action and because they are sensitive to temperature changes, there is no difficulty in preparing partial polymers of substantially any predetermined viscosity or hardness using di(tertiary alkyl) peroxides as catalysts, whereas with other catalysts the reaction often "runs away," making accurate control impossible.

The advantages of using the di(tertiary alkyl) peroxides are especially apparent in interrupted polymerization reactions. With many polymerizable materials it is difficult to stop the reaction at the end of the first polymerization period when benzoyl peroxide is used, the polymerization continuing, usually slowly, even at room temperature or below, resulting in the gradual gelling or hardening of the material. This often renders the material unfit for its intended use. To overcome this difficulty it has been suggested to add a polymerization inhibitor at the end of the first polymerization period, but this further complicates the problem in that the inhibitor must usually be removed, or its activity negated in some way, before the onset of the second period.

Turning to the case at hand, it has been found that when di(tertiary alkyl) peroxides are used as catalysts most unpolymerized materials and partially polymerized materials may be stored for indefinite periods of time and further manipulated in any of a variety of ways at room temperature or below with ordinary precautions without the required addition of a polymerization inhibitor.

The second period of polymerization in interrupted polymerization reactions is often desirably conducted at relatively high temperatures. In contrast with benzoyl peroxide, the di(tertiary alkyl) peroxides do not yield colored decomposition products when subjected to these conditions. The same is true of compression and injection molding, and extrusion processes, where for many years the deleterious effect of residual catalyst has prevented some of the so-called water-white resins from finding general favor.

The possible uses of the products of the polymerization of polymerizable unsaturated organic compounds under the catalytic influence of di(tertiary alkyl) peroxides will depend largely upon the nature of the starting material and the chemical and physical conditions under which polymerization is effected. In general, the uses of the products will be substantially the same as for corresponding resins formed with other catalysts, except that the application of the former will in many instances be facilitated by the stability of the partial polymer with respect to change in viscosity or hardness, as explained hereinabove.

The resins formed in accordance with the present invention may usually be identified by their content of a residual amount of the di(tertiary alkyl) peroxide, or peroxides used as catalyst.

As used in this application, the term "polymerization" refers to the linking together of unsaturated molecules whereby there is formed a molecule of higher molecular weight having proportionately less unsaturation than the original molecules. Excluded is so-called "condensation polymerization" which does not necessarily involve a proportionate reduction in unsaturation and in which the linkage in the polymer has been effected through functional groups other than double bonds. An example of a "condensation polymerization" is that which occurs in the formation of synthetic linear polyamides from diamines and dicarboxylic acids, or from monoamino mono-carboxylic acids. The term "unsaturated" is used in exclusion of the type of unsaturation which occurs in the aromatic ring.

We claim as our invention:

1. A process of forming a synthetic resin which comprises polymerizing diallyl phthalate by heating in the presence of between about 0.01% and about 5% of di(tertiary butyl) peroxide.

2. A process of forming a synthetic resin which comprises polymerizing diallyl phthalate by heating in the presence of between about 0.01% and about 5% of a symmetrical saturated di(tertiary alkyl) peroxide.

3. A process which comprises polymerizing, by heating in the presence of between about 0.01% and about 5% of a symmetrical saturated di(tertiary alkyl) peroxide, an unsaturated polymerizable compound containing two groups

which are in non-conjugated relationship to each other.

4. A process which comprises polymerizing unsaturated polymerizable compounds containing the non-aromatic group

by heating in the presence of between about 0.01% and about 5% of a di(tertiary alkyl) peroxide.

5. A composition comprising diallyl phthalate and between about 0.01% and about 5% of di(tertiary butyl) peroxide.

6. A composition comprising diallyl phthalate and between about 0.01% and about 5% of a symmetrical saturated di(tertiary alkyl) peroxide.

7. A composition comprising an unsaturated polymerizable compound containing two groups

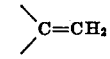

which are in non-conjugated relationship to each other, and between about 0.01% and about 5% of a symmetrical saturated di(tertiary alkyl) peroxide.

8. A composition comprising an unsaturated polymerizable compound containing the group

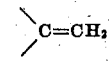

and between about 0.01% and about 5% of a saturated di(tertiary alkyl) peroxide.

9. A composition comprising between about 0.01% and about 5% of a di(tertiary alkyl) peroxide and an unsaturated polymerizable compound containing the non-aromatic group

10. A process which comprises polymerizing, by heating in the presence of between about 0.01% and about 5% of a saturated di(tertiary alkyl) peroxide, an unsaturated polymerizable compound containing the group

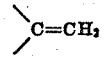

11. A process of forming a synthetic resin which comprises polymerizing methyl methacrylate by heating in the presence of between about 0.01% and about 5% of a symmetrical saturated di(tertiary alkyl) peroxide.

12. A composition comprising methyl methacrylate and between about 0.01% and about 5% of a symmetrical saturated di(tertiary alkyl) peroxide.

WILLIAM E. VAUGHAN.
FREDERICK F. RUST.

REFERENCES CITED

The following references are of record in the file of this patent:

UNITED STATES PATENTS

| Number | Name | Date |
|---|---|---|
| 2,280,432 | Kropa | Apr. 21, 1942 |
| 2,305,224 | Patterson | Dec. 15, 1942 |
| 2,310,961 | Kropa | Feb. 16, 1943 |
| 2,280,242 | Kropa | Apr. 21, 1942 |
| 2,074,782 | Edgar | Mar. 23, 1937 |
| 2,294,226 | D'Alelio | Aug. 25, 1942 |
| 2,300,566 | Hahn | Nov. 3, 1942 |
| 2,339,058 | D'Alelio | Jan. 11, 1944 |